(12) United States Patent
Kurpejovic et al.

(10) Patent No.: US 11,278,850 B2
(45) Date of Patent: Mar. 22, 2022

(54) MIXER

(71) Applicant: Eberspächer Exhaust Technology GmbH & Co. KG, Neunkirchen (DE)

(72) Inventors: Enver Kurpejovic, Kirchheim unter Teck (DE); Fatih Uysal, Ostfildern (DE); Florian Friedrich, Esslingen (DE); Oleksandr Semenov, Plochingen (DE); Krishna Kumar Vempati, Esslingen (DE)

(73) Assignee: PUREM GMBH, Neunkirchen (DE)

( * ) Notice: Subject to any disclaimer, the term of this patent is extended or adjusted under 35 U.S.C. 154(b) by 350 days.

(21) Appl. No.: 16/444,908

(22) Filed: Jun. 18, 2019

(65) Prior Publication Data
US 2019/0388848 A1 Dec. 26, 2019

(30) Foreign Application Priority Data
Jun. 20, 2018 (DE) ...................... 10 2018 114 755.4

(51) Int. Cl.
| | |
|---|---|
| *F01N 3/00* | (2006.01) |
| *B01F 3/02* | (2006.01) |
| *B01F 3/04* | (2006.01) |
| *B01F 5/06* | (2006.01) |
| *F01N 3/28* | (2006.01) |
| *F01N 3/021* | (2006.01) |

(52) U.S. Cl.
CPC .......... *B01F 3/022* (2013.01); *B01F 3/04049* (2013.01); *B01F 5/0608* (2013.01); *F01N 3/2892* (2013.01); *F01N 3/021* (2013.01); *F01N 2240/16* (2013.01); *F01N 2610/02* (2013.01); *F01N 2610/102* (2013.01); *F01N 2610/1453* (2013.01)

(58) Field of Classification Search
CPC .... B01F 3/022; B01F 3/04049; B01F 5/0608; B01F 3/2892; B01F 3/021; B01F 2240/16; B01F 2610/02; B01F 2610/102; B01F 2610/1453
See application file for complete search history.

(56) References Cited

U.S. PATENT DOCUMENTS

| | | | |
|---|---|---|---|
| 9,506,386 | B2 | 11/2016 | Brunel |
| 9,810,119 | B2 | 11/2017 | Gschwind |

(Continued)

FOREIGN PATENT DOCUMENTS

| | | |
|---|---|---|
| CN | 102149905 A | 8/2011 |
| CN | 107859551 A | 3/2018 |

(Continued)

*Primary Examiner* — Matthew T Largi
(74) *Attorney, Agent, or Firm* — McGlew and Tuttle, P.C.

(57) ABSTRACT

A mixer is provided for mixing exhaust gas (A) flowing in an exhaust gas-carrying duct (14) of an internal combustion engine with reactant injected into the exhaust gas-carrying duct (14). The mixer includes a mixing body (22) with a reactant-receiving duct (34), an exhaust gas inlet opening device (54) with a plurality of exhaust gas inlet openings (56) leading to the reactant-receiving duct (34), and at least one releasing duct (40, 42) leading away from the reactant-receiving duct (34) with a releasing duct opening (48, 50) for releasing a reactant/exhaust gas mixture from the mixer body (22). An electrically energizable heater (68) is provided at the mixer body (22).

20 Claims, 3 Drawing Sheets

(56) References Cited

U.S. PATENT DOCUMENTS

| | | | |
|---|---|---|---|
| 10,215,076 B2 * | 2/2019 | Solipuram | B01F 5/0473 |
| 10,473,018 B2 * | 11/2019 | Vankan | B01F 3/04049 |
| 2005/0013756 A1 | 1/2005 | Amou | |
| 2015/0152766 A1 | 6/2015 | Brunel | |
| 2015/0267596 A1 * | 9/2015 | Tobben | F01N 13/08 |
| | | | 60/274 |
| 2015/0315943 A1 * | 11/2015 | Gschwind | B01F 5/0616 |
| | | | 422/180 |
| 2016/0319720 A1 * | 11/2016 | Alano | B01F 5/0065 |
| 2017/0159526 A1 * | 6/2017 | Middelmann | F01N 3/2006 |
| 2017/0254244 A1 * | 9/2017 | Kurpejovic | B01D 46/0027 |
| 2018/0080360 A1 | 3/2018 | Kurpejovic | |
| 2018/0135487 A1 * | 5/2018 | Vempati | F01N 3/2006 |
| 2018/0371978 A1 * | 12/2018 | Sampath | F01N 3/2066 |
| 2019/0063291 A1 * | 2/2019 | Ker | F01N 3/2892 |
| 2020/0088081 A1 * | 3/2020 | Rohde | F01N 3/208 |

FOREIGN PATENT DOCUMENTS

| | | |
|---|---|---|
| CN | 108071453 A | 5/2018 |
| DE | 20 2012 011 764 U1 | 12/2012 |
| DE | 10 2014 111 310 A1 | 2/2016 |
| DE | 10 2016 104 361 A1 | 9/2017 |
| EP | 0 894 523 A1 | 2/1999 |
| EP | 2 826 973 A1 | 1/2015 |
| EP | 3 321 484 A1 | 5/2018 |
| JP | H03206314 A | 9/1991 |

\* cited by examiner

MIXER

CROSS REFERENCE TO RELATED APPLICATIONS

This application claims the benefit of priority under 35 U.S.C. § 119 of German Application 10 2018 114 755.4, filed Jun. 20, 2018, the entire contents of which are incorporated herein by reference.

TECHNICAL FIELD

The present invention pertains to a mixer for mixing exhaust gas flowing in an exhaust gas-carrying duct of an internal combustion engine with reactant injected into the exhaust gas-carrying duct, comprising a mixer body with a reactant-receiving duct, with an exhaust gas inlet opening device with a plurality of exhaust gas inlet openings leading to the reactant-receiving duct and with at least one releasing duct leading away from the reactant-receiving duct with a releasing duct opening for releasing a reactant/exhaust gas mixture from the mixer body.

TECHNICAL BACKGROUND

Such a mixer for mixing exhaust gas flowing in an exhaust gas duct of an internal combustion engine with reactant injected into the exhaust gas duct is known from DE 10 2016 104 361 A1. This prior-art mixer has an essentially disk-like configuration and comprises plate-like mixer parts connected to one another. The mixer parts composed of different bulge areas define together a reactant-receiving duct, into which the reactant released by an injector is introduced and into which exhaust gas flowing in an exhaust gas duct enters via the exhaust gas inlet opening device. The two mixer parts define together two releasing ducts, which lead away from the reactant-receiving duct and via which the mixture of reactant and exhaust gas or the majority of the mixture of reactant and exhaust gas is released into the area of the exhaust gas duct following in the downstream direction.

SUMMARY

An object of the present invention is to perfect a mixer such that the mixer brings about improved mixing of reactant and exhaust gas.

This object is accomplished according to the present invention by a mixer for mixing exhaust gas flowing in an exhaust gas-carrying duct of an internal combustion engine with reactant injected into the exhaust gas-carrying duct, comprising a mixer body with
  a reactant-receiving duct,
  an exhaust gas inlet opening device with a plurality of exhaust gas inlet openings leading to the reactant-receiving duct, and
  at least one releasing duct leading away from the reactant-receiving duct with a releasing duct opening for releasing a reactant/exhaust gas mixture from the mixer body.

An electrically energizable heater is provided at the mixer body according to the principles of the present invention.

By assigning such a heater to the mixer, the mixer body of the mixer can be heated, so that reactant introduced into the mixer in the form of a spray or in the form of droplets is heated, especially when it reaches the inner surface areas of the mixer body, and it evaporates in the process and is mixed efficiently with the exhaust gas, which also flows through the mixer body. It is thus possible to ensure improved evaporation and hence mixing of the reactant with the exhaust gas especially also when the different system areas of an exhaust system, especially also the mixer, have relatively low temperatures at the beginning of the operation of an internal combustion engine.

In order not to comprise the reactant stream and also the exhaust gas stream in the interior of the mixer, it is proposed that the heater be arranged on an outer side of the mixer body.

It is possible for an operationally reliable configuration that the heater comprise a layered structure with a first insulation layer arranged facing or/and in contact with the mixer body, with a heating layer, which is arranged on the side of the first insulating layer, which side faces away from the mixer body and which heating layer can be heated by electrical energization, and with a second insulating layer arranged on a side of the heating layer facing away from the mixer body.

A cover element fixed to the mixer body on a side of the second insulating layer facing away from the heating layer may be provided for fixing the heater at the mixer body, the first insulating layer, the heating layer and the second insulating layer being held between the mixer body and the cover element.

In order to also achieve heating of the mixer body in a larger surface area, it is proposed that the heating layer comprise a heating conductor extending with a winding pattern (extending in a wound manner).

At least one insulating layer may be made of mica material or as a mica mat. Further, the cover element may be made of a metallic material. This is especially advantageous when the mixer body is also made of a metallic material. The cover element may be fixed to the mixer body in this case by connection in substance, preferably by welding.

It is proposed for an efficient thermal interaction of the reactant with the heater that the reactant-receiving duct have a reactant-receiving end area and a releasing end area, wherein the at least one releasing duct leads away from the reactant-receiving duct in the releasing end area, and that the heater be arranged at the mixer body at least in the area of the releasing end area of the reactant-receiving duct.

Two releasing ducts may lead away from the reactant-receiving duct preferably in essentially opposite directions. Provisions are preferably made in case of such a configuration for the heater to be arranged at the mixer body in an area between the two releasing ducts. A majority of the reactant introduced into the reactant-receiving duct can reach the surface of the mixer body in the aforementioned area of the mixer body or of the reactant-receiving duct formed therein, so that effective heating of the reactant can be achieved.

The mixer body may comprise an essentially plate-like (plate shaped) first mixer body part and an essentially plate-like mixer body part connected to the first mixer body part.

Especially if the mixer body is configured with the two mixer body parts, provisions may be made in a structurally simple manner for the first mixer body part to comprise first bulge area defining the reactant-receiving duct and, on both sides of the first bulge area, a plate area, which is connected to the second mixer body part or/and which defines a releasing duct, or/and for the second mixer body part to comprise a second bulge area defining the reactant-receiving duct and a third bulge area defining the at least one releasing duct. The heater is preferably arranged at the second mixer body part especially if the second mixer body part is arranged oriented in the downstream direction in the exhaust gas stream.

A discharge opening device with a plurality of discharge openings leading out of the reactant-receiving duct or/and out of the at least one releasing duct may be provided for the efficient release of the mixture of reactant and exhaust gas.

The present invention further pertains to an exhaust system for an internal combustion engine, comprising an exhaust gas-carrying duct, a mixer configured according to the present invention, and a reactant injection device for injecting reactant into the reactant-receiving duct of the mixer.

To ensure efficient transmission of heat to the mixer body, provisions may be made for the heater to be arranged on a side of the mixer body that is oriented in the downstream direction in relation to an exhaust gas flow direction.

The mixer may cover essentially the entire flow cross-sectional area of the exhaust gas-carrying duct in the exhaust gas-carrying duct. Further, the reactant-receiving duct or/and the at least one releasing duct may extend essentially at right angles to an exhaust gas flow direction in the exhaust gas-carrying duct. To force as efficient a mixing as possible of reactant and exhaust gas, it is further proposed that the reactant injection device inject reactant essentially at right angles to the exhaust gas flow direction in the exhaust gas-carrying duct. To react the reactant introduced into the exhaust gas, a catalytic converter device for the selective reduction or/and a particle filter device is preferably provided downstream of the mixer.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
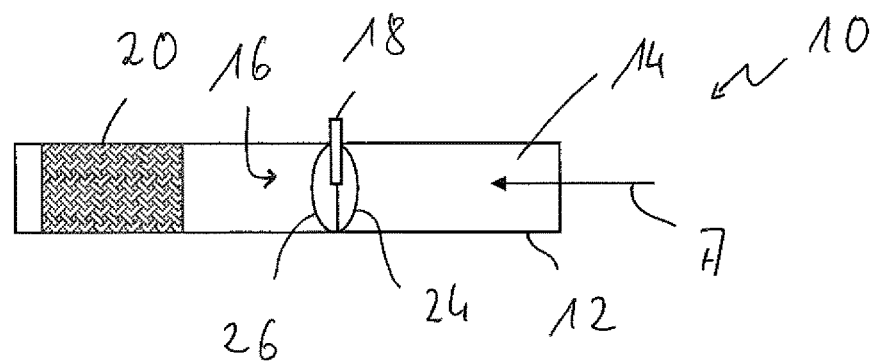
FIG. 1 is a schematic view of a part of an exhaust system with a mixer integrated into an exhaust gas-carrying duct.
Figure 2:
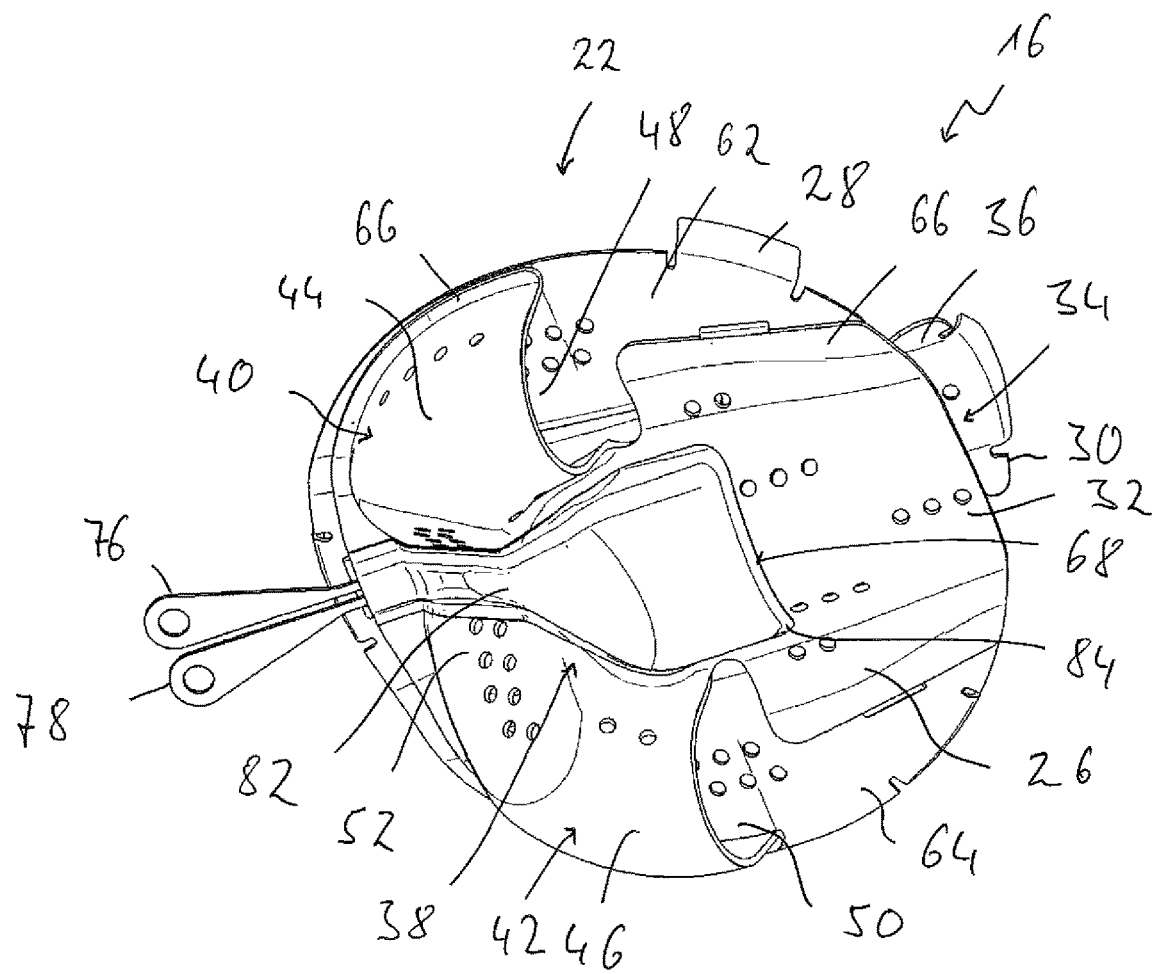
FIG. 2 is a perspective view of a mixer used in the exhaust system according to FIG. 1.
Figure 3:
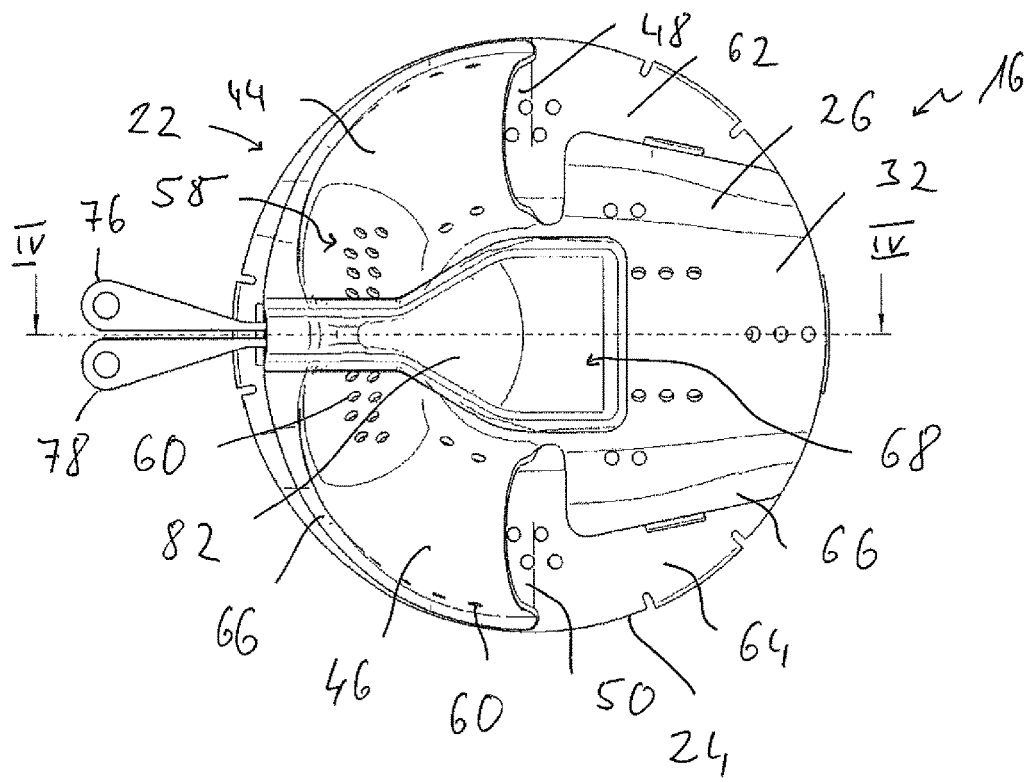
FIG. 3 is an axial view of the mixer according to FIG. 2.
Figure 4:
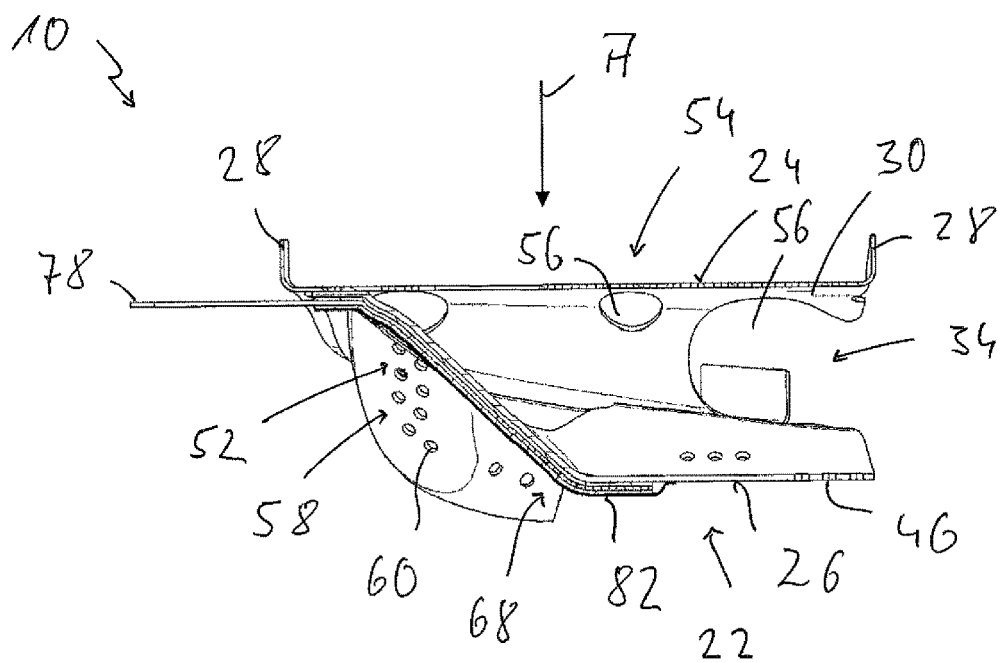
FIG. 4 is a sectional view of the mixer according to FIG. 3, cut along a line IV-IV in FIG. 3.
Figure 5:
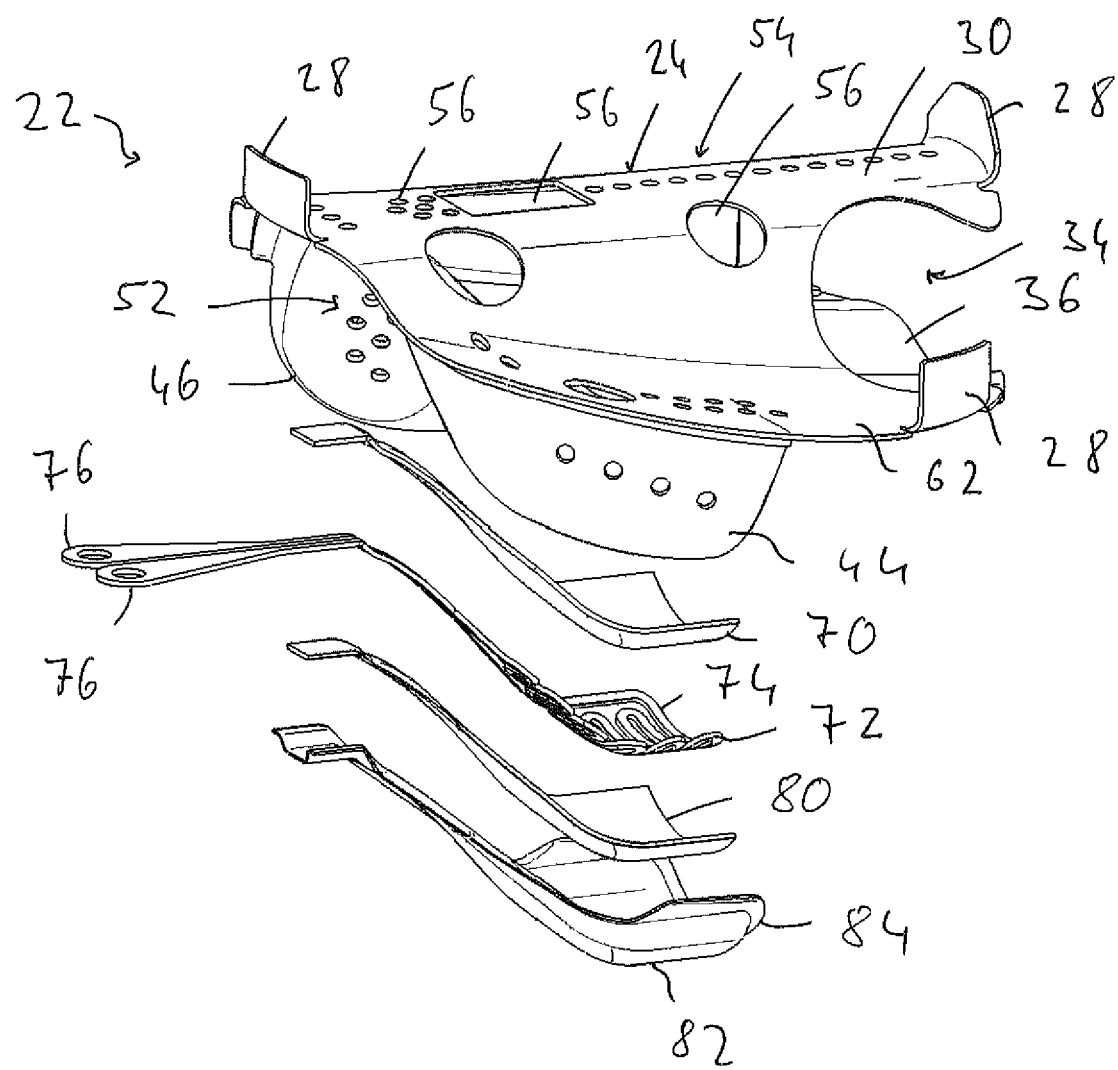
FIG. 5 is an exploded perspective view showing the mixer with a heater.

Referring to the drawings, FIG. 1 shows a section of an exhaust system of an internal combustion engine of a vehicle, which exhaust system is generally designated by 10. The exhaust system 10 comprises in an exhaust gas pipe 12 an exhaust gas duct 14, into which the exhaust gas A discharged by an internal combustion engine, especially a diesel internal combustion engine, flows. A mixer, generally designated by 16, is arranged in the exhaust gas duct 14. This mixer 16 covers essentially the entire flow cross section of the exhaust gas duct 14, so that the total amount of the exhaust gas A flowing in the exhaust gas duct 14 must essentially also flow through the mixer 16, which has an essentially disk-like (disk shaped) configuration and will be described in detail below. Flowthrough spaces, in which a small portion of the exhaust gas A can flow farther without flowing through the mixer 16, may also be present at the outer circumferential area of the mixer 16 in slot-like (slot shaped) intermediate spaces between this outer circumferential area and the exhaust gas pipe 12.

A reactant-releasing device 18, generally called injector, is associated with the mixer 16. A reactant, for example, a urea/water solution, can be introduced through the reactant-releasing device 18 in the area of the mixer 16 into the exhaust gas stream and mixed with the exhaust gas A. The mixture of exhaust gas and reactant, which is thus formed in the area of the mixer 16, flows farther in the exhaust gas duct 14 to an exhaust gas treatment unit 20, which may comprise an SCR catalytic converter device, and possibly also a particle filter. To reduce the percentage of nitrogen oxides in the exhaust gas A in the SCR catalytic converter device, the reactant introduced into the exhaust gas in the area of the mixer 16 is reacted in a selective catalytic reduction.

The configuration of the mixer 16 will be described in detail below with reference to FIGS. 2 through 5.

The mixer 16 is configured with its essentially disk-like shape with an approximately circular outer cross-sectional geometry adapted to the inner cross-sectional geometry of the exhaust gas pipe 12. The mixer 16 comprises a mixer body 22 with two mixer body parts 24, 26 provided, for example, as shaped sheet metal parts. The first mixer body part 24, which is to be positioned such that it is oriented in the upstream direction in the exhaust gas stream, may have at its outer circumferential area a plurality of mounting straps 28, in the area of which the mixer body 22 can be fixed on the inner side of the exhaust gas pipe 12. The first mixer body part 24 has a first bulge area 30 in a central area thereof. In association with the first bulge area 30, the second mixer body part 26 also has a second bulge area 32. These are located essentially congruently and define a reactant-receiving duct 34 extending in the mixer body 22 essentially radially, radially being related to the circular disk-like shape of the mixer body. The reactant-receiving duct 34 is open at an outer circumferential area. The reactant-releasing device 18 may be positioned in this area such that it meshes with the reactant-receiving duct 34 in at least some areas, so that the reactant released by this releasing device is introduced into the reactant-receiving 34 approximately from the radially outwards area into the radially inwards area. The reactant flows now, starting from a reactant-receiving end area 36, with which the reactant-releasing device 18 can mesh, to a releasing end area 38 of the reactant-receiving duct 34. In this releasing end area 38, the reactant-receiving duct 34 passes over into two releasing ducts 40, 42. These are provided essentially between third bulge areas 44, 46 at the second mixer body part 26 and areas of the first mixer body part 24, which are located opposite these. The two releasing ducts 40, 42 lead away from the reactant-receiving duct 34 in the releasing end area 38 in essentially opposite directions and are open via respective releasing duct openings 48, 50 at their ends located at a distance from the releasing end area 38. To achieve now an efficient and above all also uniform introduction of exhaust gas and reactant into the releasing ducts 40, 42, a vault 52 providing respective deflecting surfaces is formed between the two third bulge areas 44, 46 on the second mixer body part 26.

To make possible the entry of exhaust gas A flowing in the exhaust gas duct 14 into the mixer body 22, especially into the reactant-receiving duct 34, an exhaust gas inlet opening device 54 with a plurality of exhaust gas inlet openings 56 having different shapes and different dimensions are provided in the first mixer body part 24. Some of these may be arranged such that the exhaust gas entering through these into the mixer body 22 enters the reactant-receiving duct 34, but some of them may also be arranged such that the exhaust gas entering though this flows into the releasing ducts 40, 42. Further, a discharge opening device 58 with a plurality of discharge openings 60 may be provided especially at the second mixer body part 26. In addition to the discharge of exhaust gas and reactant, which is made possible in the area of the exhaust gas releasing openings 48, 50, exhaust gas and, together with this, also reactant can also be released from the releasing ducts 40, 42 via the discharge openings 60.

The two mixer body parts 24, 26 are preferably connected to one another permanently by connection in substance, for example, by welding. Plate areas 62, 64, in the area of which the second mixer body part 26 may be connected to the first mixer body part 24 in connection areas 66 adjoining the second bulge area 32 and the two third bulge areas 44, 46, may be provided for this purpose at the first mixer body part 24 on both sides of the first bulge area 30.

The mixer 16 has, furthermore, a heater, which is generally designated by 68. The heater 68 is provided at the mixer body 22 essentially in the area of the second mixer body part 26 on the outer side of the mixer body 22, which said outer side is to be arranged such that it is oriented in the downstream direction in relation to the exhaust gas stream. The heater 68 has a layered configuration. A first insulating layer 70, made of a heat-resistant material, e.g., mica mat, is arranged in contact with the mixer body 22, especially the second mixer body part 26. It is seen especially in FIG. 5 that the first insulating layer 70 has a shape adapted to the outer contour of the second mixer body part 26, especially in the area of the vault area 52 and of the second bulge area 32.

A heating layer, generally designated by 72, is arranged on the side of the first insulating layer 70 facing away from the mixer body 22 or from the second mixer body part 26. This heating layer 72 comprises a heating conductor 74 preferably wound in a meandering pattern with two terminal areas 76, 78 projecting for the electrical contacting. For the electrical contacting of the heater 68, the two terminal areas 76, 78 may be led, for example, through an opening provided in the exhaust gas pipe 12 in the area of the mixer 16. This opening may be provided in a length area of the exhaust gas pipe 12, in which an opening is also provided on a diametrically opposite side for the insertion of the reactant-releasing device 18 into the exhaust gas duct 14 or into the reactant-receiving duct 34 of the mixer 16.

A second insulating layer 80 made of a heat-resistant material, e.g., as a mica mat, is arranged on the side of the heating layer 72 and of the heating conductor 74 heatable by electrical energization, which side faces away from the mixer body 22 and from the first insulating layer 70. Just like the heating layer 72 and the first insulating layer 70, this second insulating layer 80 is also adapted to the shape of the second mixer body part 26 and it completely covers the heating layer 72 in the area thereof that is in contact with the first insulating layer 70.

A cover element generally designated by 82 is provided to fix the heater 68 at the mixer body 22. This cover element 82, likewise configured, for example, as a shaped sheet metal part, has a shape that also corresponds to the shape of the insulating layers 70, 80 and of the heating layer 72 and further has a circumferential edge 84, which may be connected, preferably by connection in substance (such as with a weld connection), to the second mixer body part 26, adjoining this in at least some areas. For example, a welding operation may be employed here as well in order to fix the cover element 82 to the mixer body 22, so that the two insulating layers 70, 80 and the heating layer 72 arranged between them are fixed between the second mixer body part 26 and the cover element 82. Even though, for example, the two insulating layers 70, 80 may be combined with the heating layer 72, for example, by bonding or the like to form an assembly unit, this bonding may also be guaranteed by the cover element fixing the two insulating layers 70, 80 and the heating layer 72 at the mixer body 22.

If the mixer 16 is integrated into the exhaust gas pipe 12, this mixer is arranged such that the second mixer body part 26 and hence also the heater 68 are oriented in the downstream direction in relation to the exhaust gas stream. It can be guaranteed in this manner that the heat provided by energizing the heating layer 72 can be efficiently introduced into the mixer body 22. Since the heater 68 is arranged such that the heating area 72 is arranged such that it essentially also covers the releasing end area 38 of the reactant-receiving duct 34, the mixer body 22 is heated by the heater 68 especially where the reactant released from the reactant-releasing device 18 in the form of a spray or droplets will primarily reach the inner surface of the mixer body 22. The reactant can thus absorb heat efficiently and be evaporated as a result. This guarantees an efficient mixing of evaporated reactant and of the exhaust gas A flowing through the mixer already in the interior of the mixer 16.

While specific embodiments of the invention have been shown and described in detail to illustrate the application of the principles of the invention, it will be understood that the invention may be embodied otherwise without departing from such principles.

What is claimed is:

1. A mixer for mixing exhaust gas flowing in an exhaust gas-carrying duct of an internal combustion engine with reactant injected into the exhaust gas-carrying duct, the mixer comprising:
 a mixer body comprising:
  a reactant-receiving duct;
  an exhaust gas inlet opening device with a plurality of exhaust gas inlet openings leading to the reactant-receiving duct; and
  at least one releasing duct leading away from the reactant-receiving duct, the at least one releasing duct having a releasing duct opening for releasing a reactant/exhaust gas mixture from the mixer body; and
 an electrically energizable heater provided at the mixer body, wherein the mixer body comprises:
  an essentially plate shaped first mixer body part having a first bulge area defining the reactant-receiving duct and, on both sides of the first bulge area, a plate area, which first mixer body part is to be arranged oriented in a upstream direction in relation to an exhaust gas flow direction,
  an essentially plate shaped second mixer body part having a second bulge area together with the first bulge area of the first mixer body part defining the reactant-receiving duct, a third bulge area defining the at least one releasing duct and connecting areas adjoining the second bulge area and the third bulge area, the first mixer body part being connected to the second mixer body part at the plate areas of the first mixer body part and the connecting areas of the second mixer body part, which second mixer body part is to be arranged oriented in a downstream direction in relation to the exhaust gas flow direction,
wherein the heater is arranged at the second bulge area of the second mixer body part on an outer side of the second mixer body part, which outer side is to be arranged oriented in the downstream direction.

2. The mixer in accordance with claim 1, wherein the heater is arranged on an outer side of the mixer body.

3. The mixer in accordance with claim 1, wherein the heater comprises a layered configuration, the layered configuration comprising:
a first insulating layer arranged facing the mixer body or in contact with the mixer body or both facing and in contact with the mixer body;
a heating layer arranged on a side of the first insulating layer, which said side of the first insulating layer faces away from the mixer body, the heating layer heatable by electrical energization, and
a second insulating layer arranged on a side of the heating layer, which said side of the heating layer faces away from the mixer body.

4. The mixer in accordance with claim 3, wherein:
a cover element fixed to the mixer body is provided on a side of the second insulating layer, which side faces away from the heating layer; and
the first insulating layer, the heating layer and the second insulating layer are held between the mixer body and the cover element.

5. The mixer in accordance with claim 3, wherein the heating layer comprises a heating conductor extending with a winding pattern.

6. The mixer in accordance with claim 3, wherein:
at least one of the first insulating layer and the second insulating layer is made of a mica material; or
the cover element is made of a metallic material; or
at least one of the first insulating layer and the second insulating layer is made of a mica material and the cover element is made of a metallic material.

7. The mixer in accordance with claim 6, wherein the mixer body is made of a metallic material and that the cover element is fixed to the mixer body by connection in substance.

8. The mixer in accordance with claim 1, wherein:
the reactant-receiving duct comprises a reactant-receiving end area and a releasing end area;
the at least one releasing duct leads away from the reactant-receiving duct in the releasing end area; and
the heater is arranged at the mixer body at least in the area of the releasing end area of the reactant-receiving duct.

9. The mixer in accordance with claim 1, wherein:
the at least one releasing duct comprises two releasing ducts leading away from the reactant-receiving duct in essentially opposite directions; and
the heater is arranged at the mixer body in an area between the two releasing ducts.

10. The mixer in accordance with claim 1, wherein a discharge opening device is provided with a plurality of discharge openings leading out of the reactant-receiving duct or/and out of the at least one releasing duct.

11. An exhaust system for an internal combustion engine, the exhaust system comprising:
an exhaust gas-carrying duct;
a reactant injection device; and
a mixer, the mixer comprising:
a mixer body comprising a reactant-receiving duct, an exhaust gas inlet opening device with a plurality of exhaust gas inlet openings leading to the reactant-receiving duct, and at least one releasing duct leading away from the reactant-receiving duct, the at least one releasing duct having a releasing duct opening for releasing a reactant/exhaust gas mixture from the mixer body; and
an electrically energizable heater provided at the mixer body, wherein the reactant injection device injects a reactant into the reactant-receiving duct of the mixer, wherein the mixer body comprises:
an essentially plate shaped first mixer body part having a first bulge area defining the reactant-receiving duct and, on both sides of the first bulge area, a plate area, which first mixer body part is arranged oriented in a upstream direction in relation to an exhaust gas flow direction,
an essentially plate shaped second mixer body part having a second bulge area together with the first bulge area of the first mixer body part defining the reactant-receiving duct, a third bulge area defining the at least one releasing duct and connecting areas adjoining the second bulge area and the third bulge area, the first mixer body part being connected to the second mixer body part at the plate areas of the first mixer body part and the connecting areas of the second mixer body part, which second mixer body part is arranged oriented in a downstream direction in relation to the exhaust gas flow direction,
wherein the heater is arranged at the second bulge area of the second mixer body part on an outer side of the second mixer body part, which outer side is to be arranged oriented in the downstream direction.

12. The exhaust system in accordance with claim 11, wherein:
the mixer covers essentially an entire flow cross-sectional area of the exhaust gas-carrying duct in the exhaust gas-guiding duct; or
the reactant-receiving duct or the at least one releasing duct extends essentially at right angles to an exhaust gas flow direction in the exhaust gas-carrying duct; or
the reactant injection device injects reactant essentially at right angles to the exhaust gas flow direction in the exhaust gas-guiding duct; or
a catalytic converter device for selective reduction or a particle filter device is provided downstream of the mixer; or
any combination of the mixer covers essentially an entire flow cross-sectional area of the exhaust gas-carrying duct in the exhaust gas-guiding duct, and the reactant-receiving duct or the at least one releasing duct extends essentially at right angles to an exhaust gas flow direction in the exhaust gas-carrying duct, and the reactant injection device injects reactant essentially at right angles to the exhaust gas flow direction in the exhaust gas-guiding duct, and at least one of a catalytic converter device for selective reduction and a particle filter device is provided downstream of the mixer.

13. The exhaust system in accordance with claim 12, wherein the heater comprises a layered configuration, the layered configuration comprising:
a first insulating layer arranged facing the mixer body or in contact with the mixer body or both facing and in contact with the mixer body;
a heating layer arranged on a side of the first insulating layer, which said side of the first insulating layer faces away from the mixer body, the heating layer heatable by electrical energization, and a second insulating layer arranged on a side of the heating layer, which said side of the heating layer faces away from the mixer body.

14. The exhaust system in accordance with claim 13, wherein:

a cover element fixed to the mixer body is provided on a side of the second insulating layer, which side faces away from the heating layer; and the first insulating layer, the heating layer and the second insulating layer are held between the mixer body and the cover element.

15. The exhaust system in accordance with claim 13, wherein the heating layer comprises a heating conductor extending with a winding pattern.

16. The exhaust system in accordance with claim 13, wherein:

at least one of the first insulating layer and the second insulating layer is made of a mica material; or the cover element is made of a metallic material; or at least one of the first insulating layer and the second insulating layer is made of a mica material and the cover element is made of a metallic material.

17. An exhaust gas mixer for mixing exhaust gas flowing from an upstream direction toward a downstream direction in an exhaust gas-carrying duct of an internal combustion engine with reactant injected into the exhaust gas-carrying duct, the mixer comprising:

a mixer body comprising:

an upstream facing first mixer body comprising an essentially plate shaped first mixer body part with a first bulge area extending toward the upstream direction relative to radially adjacent plate areas, the first mixer body part having a plurality of exhaust gas inlet openings;

a downstream facing second mixer body comprising an essentially plate shaped second mixer body part with a second bulge area, the second bulge area cooperating with the first bulge area to define a reactant-receiving duct with a radial outer circumferential area defining a reactant-releasing device area configured to accommodate at least a portion of a reactant-releasing device, the exhaust gas inlet openings providing fluid communication from an upstream side of the first mixer body part to the reactant-receiving duct and the second mixer body part being provided with a third bulge area cooperating with the first mixer body part to define a releasing duct in fluid communication with and leading away from the reactant-receiving duct and having a releasing duct opening for releasing a reactant/exhaust gas mixture from the mixer body, the second mixer body part having connecting areas adjoining the second bulge area and the third bulge area, the connecting areas of the second mixer body part being joined to the plate areas of the first mixer body part to directly connect the second mixer body part to the first mixer body part; and an electrically energizable heater arranged in contact with a downstream facing side of the second mixer body part.

18. The exhaust gas mixer according to claim 17, wherein:

the third bulge area comprises two third bulge regions;

the releasing duct is defined by one of the two third bulge regions in cooperation with the first mixer body part as a first releasing duct;

another of the two third bulge regions cooperates with the first mixer body part to define a second releasing duct in fluid communication with and leading away from the reactant-receiving duct and having a releasing duct opening for releasing a reactant/exhaust gas mixture from the mixer body;

the second mixer body part has a vault defining deflecting surfaces between the two third bulge regions; and the electrically energizable heater has a shape adapted to an outer contour of the downstream facing side of the second mixer body part in a region of the vault area.

19. The exhaust gas mixer according to claim 18, wherein at least a portion of the electrically energizable heater extends between the two third bulge regions.

20. The exhaust gas mixer in accordance with claim 18, wherein a discharge opening device is provided with a plurality of discharge openings leading out of the first releasing duct and the second releasing duct.

* * * * *